Sept. 29, 1936.   R. MAGNIEN   2,055,981
ELECTRIC FURNACE FOR HEATING SHEETS OF PLATE
GLASS OR SHEET GLASS BEFORE TEMPERING
Filed Jan. 9, 1935
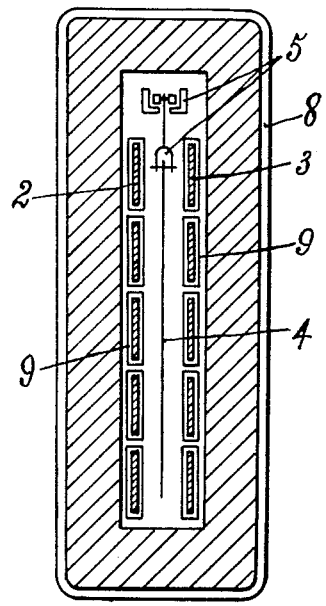
INVENTOR:
Raymond Magnien
BY
ATTORNEY

UNITED STATES PATENT OFFICE 2,055,981

ELECTRIC FURNACE FOR HEATING SHEETS OF PLATE GLASS OR SHEET GLASS BEFORE TEMPERING

Raymond Magnien, Paris, France, assignor to Société: Assurex, Le "Roi des Verres de Securite" Magnien, Monnier et Cie., a corporation of France, and Leon Alfred Edouard Petit Application January 9, 1935, Serial No. 1,057
In France January 15, 1934

4 Claims. (Cl. 49—45)

It is known that the tempering of sheets of plate glass or sheet glass consists in heating the said sheet to a temperature such that it attains the viscous state throughout its entire mass, and in cooling it rapidly, generally under the action of air jets suitably disposed on either side of the sheet of glass after its removal from the furnace.

It is also known that it is important that the temperature should be as uniform as possible throughout the entire extent of the sheet, otherwise if the blowing is distributed regularly over the entire surface, the strains, tensions and compressions, resulting from the tempering would not be exactly equalized after complete solidification, and the glass would break of itself either during the completion of its cooling from the point of transformation to the temperature of the surrounding medium, or even afterwards at the end of a greater or lesser length of time, without any external cause.

Due to this fact, the furnaces employed for heating sheets of plate glass or sheet glass have been constructed to provide the necessary equality of temperature as well as possible. This equality, however, is difficult to obtain and maintain in the furnaces employed for this manufacture, because they have to be fairly high and, due to this fact, movements of convection of the air are produced within the furnace and convey the heat from the lower portions of the furnace towards the upper portions.

In the furnaces of this kind which are electrically heated, the development of the convection movements of the air has therefore been assisted by giving to the furnaces a sufficiently large width and by distributing the heating resistances vertically, so as to produce a greater quantity of heat per unit of surface of the lower portions of the furnace than per unit of surface of the upper portions.

It has thus been possible to construct furnaces in which a sheet of plate glass or sheet glass attains a uniform temperature at the end of a certain time.

When, however, the height of these furnaces is rather considerable, a serious disadvantage arises.

If the furnace is in equilibrium at a given temperature $t$ and does not contain any sheet, the convection movements in the furnace tend to maintain such equilibrium.

If a cold sheet of plate glass or sheet glass is introduced, the equilibrium is instantaneously upset, and is re-established at the end of a certain time at the aforesaid temperature $t$.

The introduction of the cold sheets into the furnace, however, completely modifies the convection movements of the air during the re-heating period. At the commencement, they are particularly intense in the lower portions of the furnace in which the heating is most intense, then their path extends upwardly in proportion as the sheet of plate glass or sheet glass is heated, and they become normal again when the condition of equilibrium has been attained throughout the entire height of the furnace.

The sheet of plate glass or sheet glass placed in such a furnace is therefore heated more rapidly in the lower part of the furnace than in the upper part and the temperature $t$ is attained first in the lower part, then in the middle part and finally in the upper part.

Since at the temperature $t$, the sheet of plate glass or sheet glass should be in the viscous condition for it to be tempered, it follows that during the interval of time from the instant at which this temperature $t$ is attained in the lower portion to the moment at which it is attained in the upper portion, the parts which are in the viscous condition will be elongated under the weight of the lower parts of the sheet which they support.

A sheet of plate glass or sheet glass of rather considerable height (0.80 metre and above for example) is subjected on this account to an appreciable elongation in the furnace, which elongation is moreover irregular because it depends upon the shape of the sheets, the nature of the glass, its thickness, and so forth. It is therefore impossible to compensate it before hand exactly by cutting the sheet to a smaller dimension than the final dimension, and such elongation may be the cause of considerable rejects.

The present invention relates to a furnace in which there is provided not only equality of temperature of the sheet of plate glass or sheet glass introduced therein but also a rate of heating which is the same in all points.

For this purpose, the furnace which may be vertical, will preferably be of the horizontal throughway type, so as to avoid the cold zone which is to be found near the cover in vertical furnaces and which assists the convection movements of the air. The furnace has a width reduced to the strict minimum necessary for introducing the sheets to be treated with their means of attachment.

The necessary heat is provided by the radiation from heating surfaces disposed on either side of the sheets to be treated and constituting the side walls of the furnace.

The single figure of the accompanying drawing shows by way of example in cross-section one form of construction of the furnace according to the invention.

The furnace is constituted by a primary winding 8 through which passes the works' current, and the radiating plates are constituted by horizontal bands 2 and 3 of a metal whose point of disappearance of the magnetism (Curie point) is a little greater than the temperature which is to be given to the sheets.

Each band 2, 3 of magnetic metal is surrounded by a sheet 9 of non-magnetic conducting metal, which forms a closed ring around each band 2, 3.

It is thus possible to constitute the furnace by a single secondary winding surrounding all the magnetic bands, all or only a part of the said bands being also surrounded by other secondaries placed in the interior of the first secondary.

There will thus be provided a self-regulating furnace for the given temperature, differing from the known induction heating furnaces in that instead of comprising a single secondary winding, it will comprise as many secondary windings as are desired.

The flux produced by the primary winding 8 will be distributed between the magnetic bands 2 and 3 according to their temperature, and the electric power taken from the primary winding will be developed in the furnace, being automatically distributed in the vertical direction so as to compensate for the differences in temperature which may be produced.

By means of this arrangement there will therefore be added to the self-regulation in a direction perpendicular to the windings which is the fundamental property of induction furnaces, an additional self-regulation in the plane of the windings and the radiating surfaces will have exactly the same temperature in all points.

Of course, the form of construction described hereinbefore by no means limits the character of the invention and may be given any desirable constructional modifications without departing from the scope of the invention.

I claim:—

1. In an induction furnace for heating glass plates prior to tempering, a heating system comprising a primary winding surrounding the furnace, a series of superposed longitudinal elements of magnetic metal constituting inner side walls of the furnace adapted to heat the glass plate by radiation, and a secondary winding surrounding each of said elements.

2. In an induction furnace for heating glass plates prior to tempering, a heating system comprising a primary winding surrounding the furnace, a series of superposed longitudinal elements of magnetic metal constituting inner side walls of the furnace adapted to heat the glass plate by radiation, and a secondary winding surrounding each of said elements, the metal of said inner side walls having a Curie point approximating the temperature of softening of the glass.

3. In an induction furnace for heating glass plates prior to tempering, a heating system comprising a primary winding surrounding the furnace, a series of superposed longitudinal elements of magnetic metal constituting inner side walls of the furnace adapted to heat the glass plate by radiation, a first secondary winding surrounding all of said elements, and second secondary windings inside the first secondary winding and surrounding individual elements.

4. In an induction furnace for heating glass plates prior to tempering, a heating system comprising a primary winding surrounding the furnace, a series of superposed longitudinal elements of magnetic metal constituting inner side walls of the furnace adapted to heat the glass plate by radiation, a first secondary winding surrounding all of said elements, and second secondary windings inside the first secondary winding and surrounding individual elements, the metal of said inner side walls having a Curie point approximating the temperature of softening of the glass.

RAYMOND MAGNIEN.